(12) United States Patent
Shizuya et al.

(10) Patent No.: US 7,844,981 B2
(45) Date of Patent: Nov. 30, 2010

(54) OPTICAL DISK DEVICE WITH PICKUP COOLING PLATE

(75) Inventors: Mitsutaka Shizuya, Ryugasaki (JP); Shinya Tsubota, Mito (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 957 days.

(21) Appl. No.: 11/527,481

(22) Filed: Sep. 27, 2006

(65) Prior Publication Data

US 2007/0124746 A1    May 31, 2007

(30) Foreign Application Priority Data

Nov. 25, 2005    (JP) ............... 2005-339588

(51) Int. Cl.
G11B 33/14    (2006.01)
G11B 7/00    (2006.01)

(52) U.S. Cl. .................... 720/649; 720/680

(58) Field of Classification Search .......... 720/649, 720/652, 672, 678–680
See application file for complete search history.

(56) References Cited

U.S. PATENT DOCUMENTS

| | | | | |
|---|---|---|---|---|
| 5,305,299 | A | * | 4/1994 | Maeda ............... 720/680 |
| 5,745,470 | A | * | 4/1998 | Nagai et al. .......... 720/678 |
| 2001/0028627 | A1 | * | 10/2001 | Takizawa et al. ...... 369/192 |
| 2003/0021220 | A1 | * | 1/2003 | Yamauchi et al. ..... 369/249 |
| 2003/0107973 | A1 | | 6/2003 | Makino et al. |
| 2004/0128677 | A1 | * | 7/2004 | Matsui et al. ......... 720/611 |
| 2005/0005282 | A1 | * | 1/2005 | Chen .................. 720/672 |

FOREIGN PATENT DOCUMENTS

| | | |
|---|---|---|
| JP | 10-21618 | 1/1998 |
| JP | 2001-338460 | 12/2001 |
| JP | 2002-197704 | 7/2002 |
| JP | 2002-288846 | 10/2002 |
| JP | 2003-242703 | 8/2003 |
| JP | 2004-241032 | 8/2004 |
| JP | 2005-122792 | 5/2005 |
| JP | 2005-196860 | 7/2005 |

* cited by examiner

*Primary Examiner*—Craig A. Renner
*Assistant Examiner*—Gustavo Polo
(74) *Attorney, Agent, or Firm*—Antonelli, Terry, Stout & Kraus, LLP.

(57) ABSTRACT

An optical disc drive is fitted with a pickup, a non-contacting cooling plate, and a resinous movable spacer. The cooling plate adjacently faces and is fixed to the under, right, or left side of the pickup. The movable spacer is fitted to one of the facing sides of the pickup and cooling plate and prevents direct contact between the pickup and the plate. This drive structure prevents pickup movement interference due to collision between the pickup and the cooling plate, contamination production, needless electric conduction, etc., so that the clearance between the facing sides of the metallic pickup and metallic non-contacting cooling plate is narrow. The narrow clearance results in an improved heat conduction and radiation characteristic, improving the cooling of the whole pickup.

15 Claims, 12 Drawing Sheets

FRONT ⟵⟶ BACK

FRONT ⟵⟶ BACK

FIG.3

FRONT ←→ BACK

FRONT ⟷ BACK

FIG.9

FRONT ←→ BACK

FRONT ←→ BACK

FIG.13(a)

MODEL TEST SUMMARY

FIG.13(b)

OPTICAL DISK DEVICE WITH PICKUP COOLING PLATE

FIELD OF THE INVENTION

The present invention relates to an optical disc drive that drives a CD, a DVD, or another optical disc medium.

BACKGROUND OF THE INVENTION

Japanese Patent Laid-Open Publication Nos. 2005-196860, 2002-288846, and 2005-122792 disclose methods of cooling the pickup of a conventional optical disc drive for a personal computer or an optical disc recorder/player by improving the structure of the pickup or a structure in the recorder/player. The pickup is liable to be hot because it has a laser diode, which is one of heat sources. In the optical disc drive disclosed in Japanese Patent Laid-Open Publication No. 2005-196860, the heat source of the pickup is connected with low thermal resistance through a member of high thermal conductance to a cooling fin, which is fitted in a portion of the recorder/player that is exposed to the air flow formed by disc rotation. In the optical disc drive disclosed in Japanese Patent Laid-Open Publication No. 2002-288846, the main heat source of the pickup is positioned near the guiding shaft of the mechanism for moving the pickup. This optical disc drive has another bearing for heat transfer from the pickup to the guiding shaft in addition to the bearing for the movement. The main heat source of this pickup is connected with low thermal resistance to the guiding shaft. The optical disc drive disclosed in Japanese Patent Laid-Open Publication No. 2005-122792 has a non-contacting cooling plate facing the bottom of the pickup and positioned near it and within the range which the pickup moves. The heat source of this pickup is connected to the cooling plate with low thermal resistance through the air layer in the narrow clearance between this plate and the pickup bottom.

In Japanese Patent Laid-Open Publication No. 2005-196860, the replacement of graphite or another special material with a general metallic material or another method makes it possible to further increase the originally good heat radiation caused by convection at the upper side (limited to the center, which is not covered by a cover), front side, and back side of the pickup, which are exposed to the air flow formed by disc rotation. However, at many other portions such as the under, right, and left sides of the pickup, the air flow and convection are weak, so that the amount of heat radiation is small. This prevents the whole pickup from being cooled sufficiently. In Japanese Patent Laid-Open Publication No. 2002-288846, it is possible to reduce the thermal resistance from the pickup to the guiding shafts. However, the diameters, thermal conductances, surface areas, etc. of the guiding shafts are limited, so that high thermal resistance is created by the thermal conduction and convection to the parts etc. to which the guiding shafts are fixed and the ambient air. This limits the increase in the heat radiation through the guiding shafts, so that the whole pickup cannot be cooled sufficiently. In Japanese Patent Laid-Open Publication No. 2005-122792, the heat radiation from the under side of the pickup can be increased by the convection and radiation from the cooling plate, which is large in area, to the ambient air etc., with the under side of the pickup and the cooling plate positioned very close to each other (about 0.3 mm) so that the thermal resistance created by the thermal conduction and radiation through the air layer can be low. This may make it possible to cool the whole pickup well in addition to the heat radiation from the upper, front, and back sides of the pickup, which is even normally good as stated above. However, if the clearance between the under side of the pickup and the cooling plate is narrowed merely to the foregoing extent, the pickup and the cooling plate are liable to come into contact with each other due to deformation etc. of the parts connected to them. The contact between the pickup and the cooling plate increases the moving resistance to the pickup and causes needless electric conduction to the pickup, so that normal recording on and normal reproduction from a disc become difficult. This publication also discloses a method for radiating more heat by filling the clearance with heat-conducting grease, which interferes with the movement of the pickup remarkably, contaminates the optical parts remarkably, and causes other operational problems. The cooling plate is well known and basically identical in structure with the under cover protecting the under side of main parts in the housing of a slim tray-type optical disc drive in which the main parts protrude from the housing when a disc is mounted or dismounted.

The object of the present invention is to provide a method for sufficiently cooling the pickup, which becomes hot in particular, of an optical disc drive without causing problems to the operation of the drive.

SUMMARY OF THE INVENTION

An optical disc drive according to one aspect of the present invention has a spindle motor for rotating an optical disc, a pickup for irradiating the optical disc with a laser beam, a guiding mechanism on which the pickup is supported movably in a radial direction of the optical disc, a mechanism chassis to which the spindle motor, the pickup, and the guiding mechanism are fitted, and a housing capable of housing the mechanism chassis, the drive characterized by:

a non-contacting cooling plate fitted on either the side of the mechanism chassis that is opposite to the side thereof on which the optical disc can be mounted or one side thereof along which the pickup moves, the cooling plate facing the pickup adjacently; and a rolling spacer provided on either the side of the pickup that is adjacent to the cooling plate or the side of the cooling plate that is adjacent to the pickup, the spacer having a resinous main part in the form of either a roller or a ball.

An optical disc drive according to another aspect of the present invention has a spindle motor for rotating an optical disc, a pickup for irradiating the optical disc with a laser beam, a guiding mechanism on which the pickup is supported movably in a radial direction of the optical disc, a mechanism chassis to which the spindle motor, the pickup, and the guiding mechanism are fitted, and a housing capable of housing the mechanism chassis, the drive characterized in:

that a metallic non-contacting cooling plate is fitted on either the side of the mechanism chassis that is opposite to the side thereof on which the optical disc can be mounted or one side thereof along which the pickup moves, the cooling plate facing the pickup adjacently;

that the side of the pickup that is adjacent to the cooling plate is metallic; and that a resinous sliding spacer is provided on either the side of the pickup that is adjacent to the cooling plate or the side of the cooling plate that is adjacent to the pickup.

Without bringing the immovable non-contacting cooling plate into direct contact with one or more of the under side, the right side, the left side, and another side of the pickup, it is possible to position the plate closer thereto than conventionally and in Japanese Patent Laid-Open Publication No. 2005-122792. This makes it possible to cool the pickup well by means of the convection and heat radiation to the ambient air at the non-contacting cooling plate large in area, in addition to further lowering the thermal resistance created by the thermal conduction and heat radiation through the air layer between the pickup and the plate. Because heat can be radiated better than conventionally from the under side, the right side, the left side, or another side of the pickup, it is possible to cool the whole pickup more sufficiently than conventionally, in addition to the originally good heat radiation from the upper, front, and back sides of the pickup. The roller, ball, or spacer function as moving parts of the movable spacer. Specifically, the main part of the spacer is made of resin (for example, sliding material for resin bearings), which is low in friction, so that this part is low in friction even without lubrication, resistant to abrasion, and electrically insulative. Accordingly, even if the clearance between the pickup and the cooling plate becomes so small that the movable spacer comes into contact with anything, the increase in the moving resistance of the pickup is kept so small as not to interfere with the movement of the pickup. In addition, contaminations such as frictional dust are not produced, and the pickup and the cooling plate do not needlessly become electrically conductive. Consequently, no problem arises with the operation of the optical disc drive, such as recording on and reproduction from a disc.

According to the present invention, by improving the heat radiation from the under, right, and left sides of the pickup, which becomes hot in particular, of an optical disc drive without causing problems with the operation of the drive, it is possible to cool the whole pickup sufficiently in addition to the originally good heat radiation from the upper, front, and back sides of the pickup.

DETAILED DESCRIPTION OF THE PREFERRED EMBODIMENTS

Embodiments of the present invention will be described below with reference to the drawings.

Embodiment 1

Figure 1:
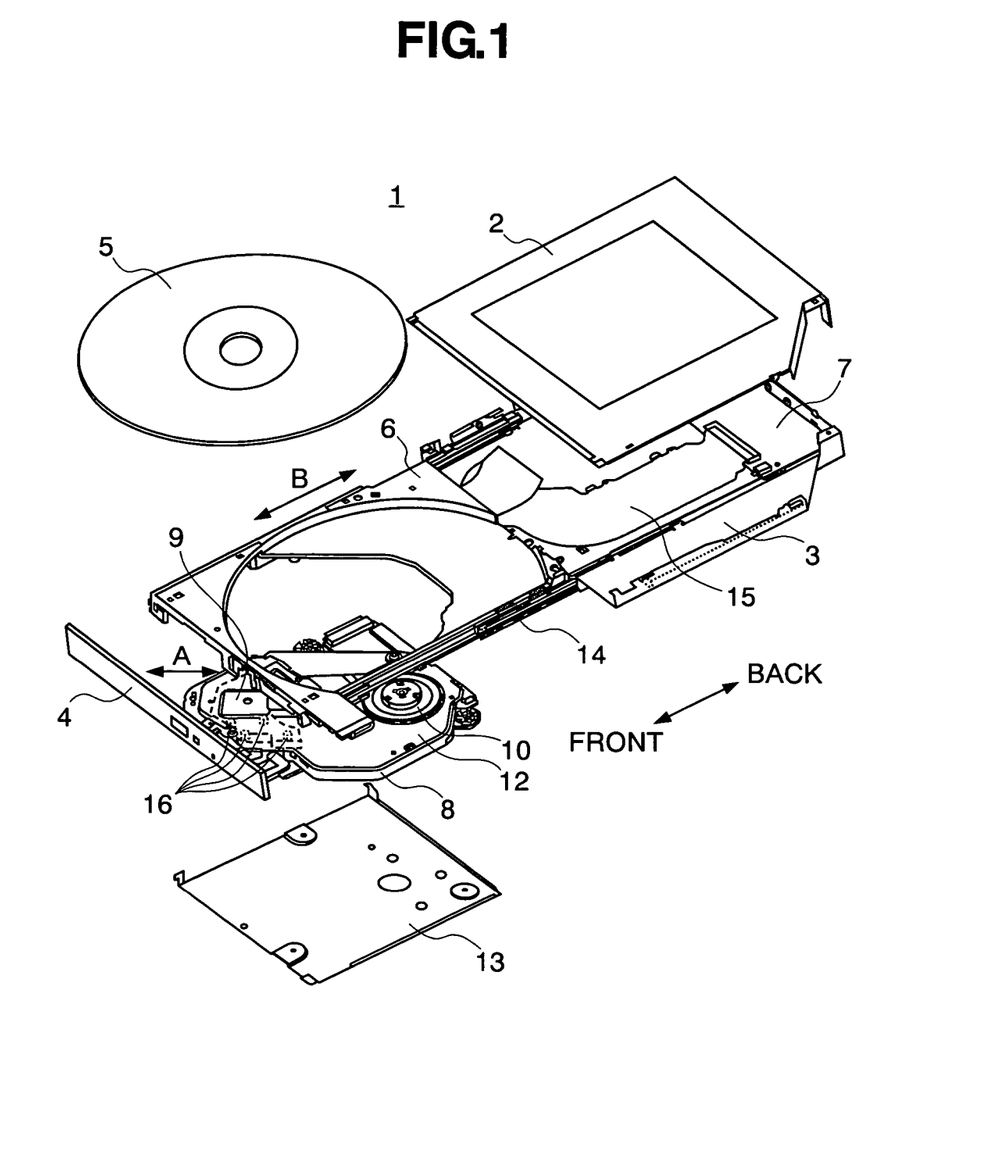
FIG. 1 is an exploded perspective view of an embodiment of an optical disc drive according to the present invention, schematically showing the structure of the drive.
Figure 2:
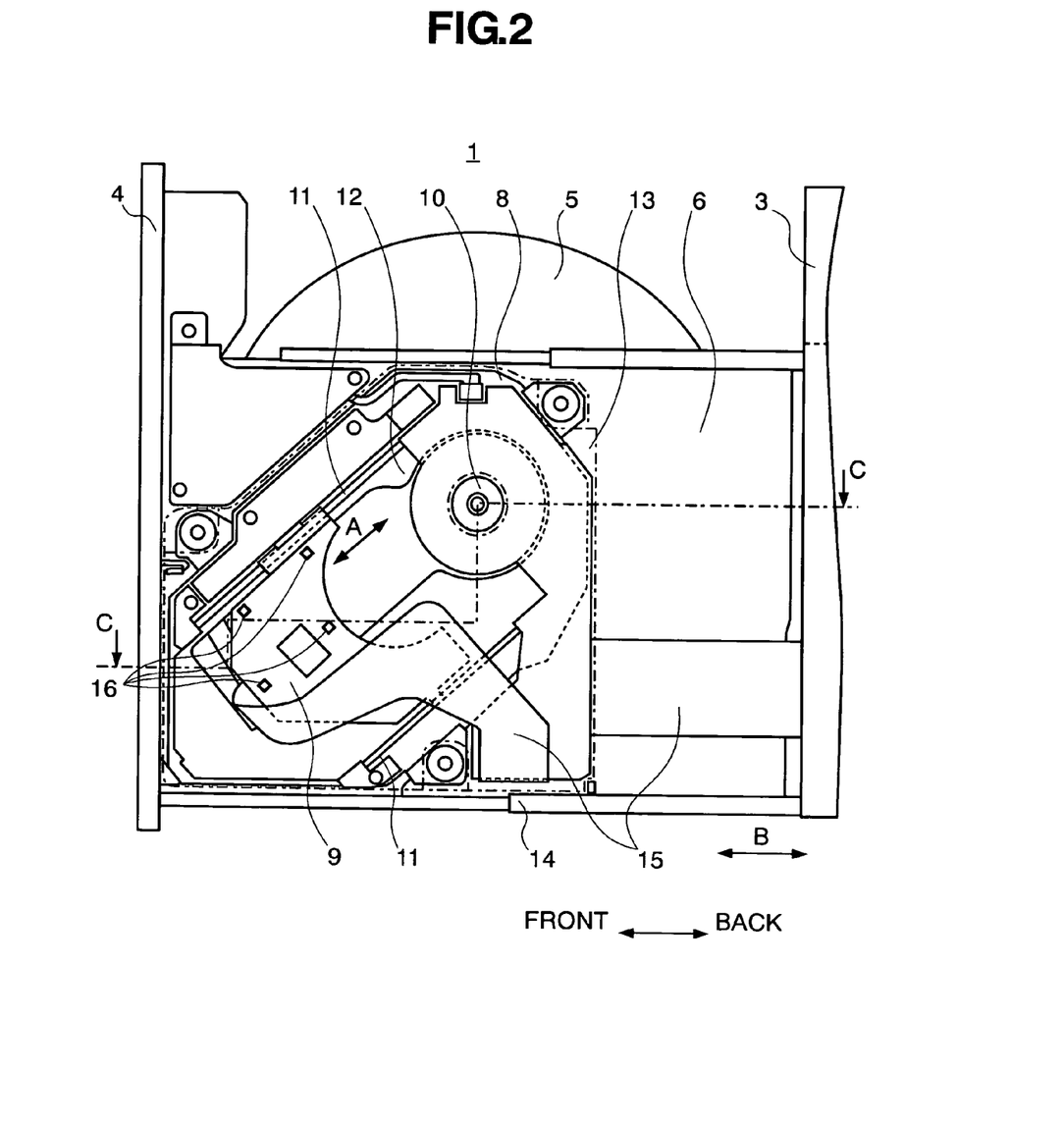
FIG. 2 is a partially omitted bottom view of a portion of the optical disc drive shown in FIG. 1.
Figure 3:
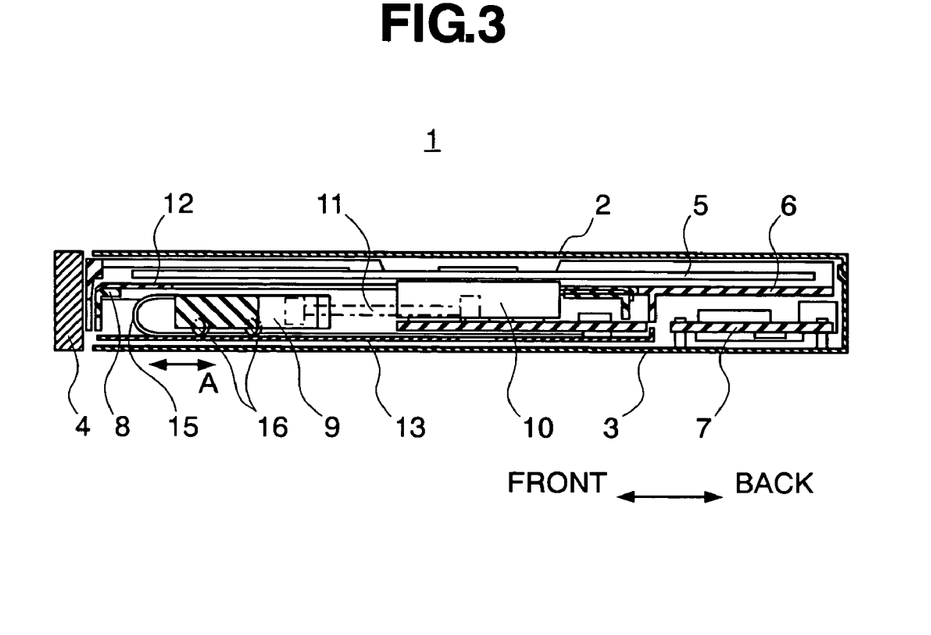
FIG. 3 is a sectional view of the whole drive that is taken along line C-C in FIG. 2.
Figure 4:
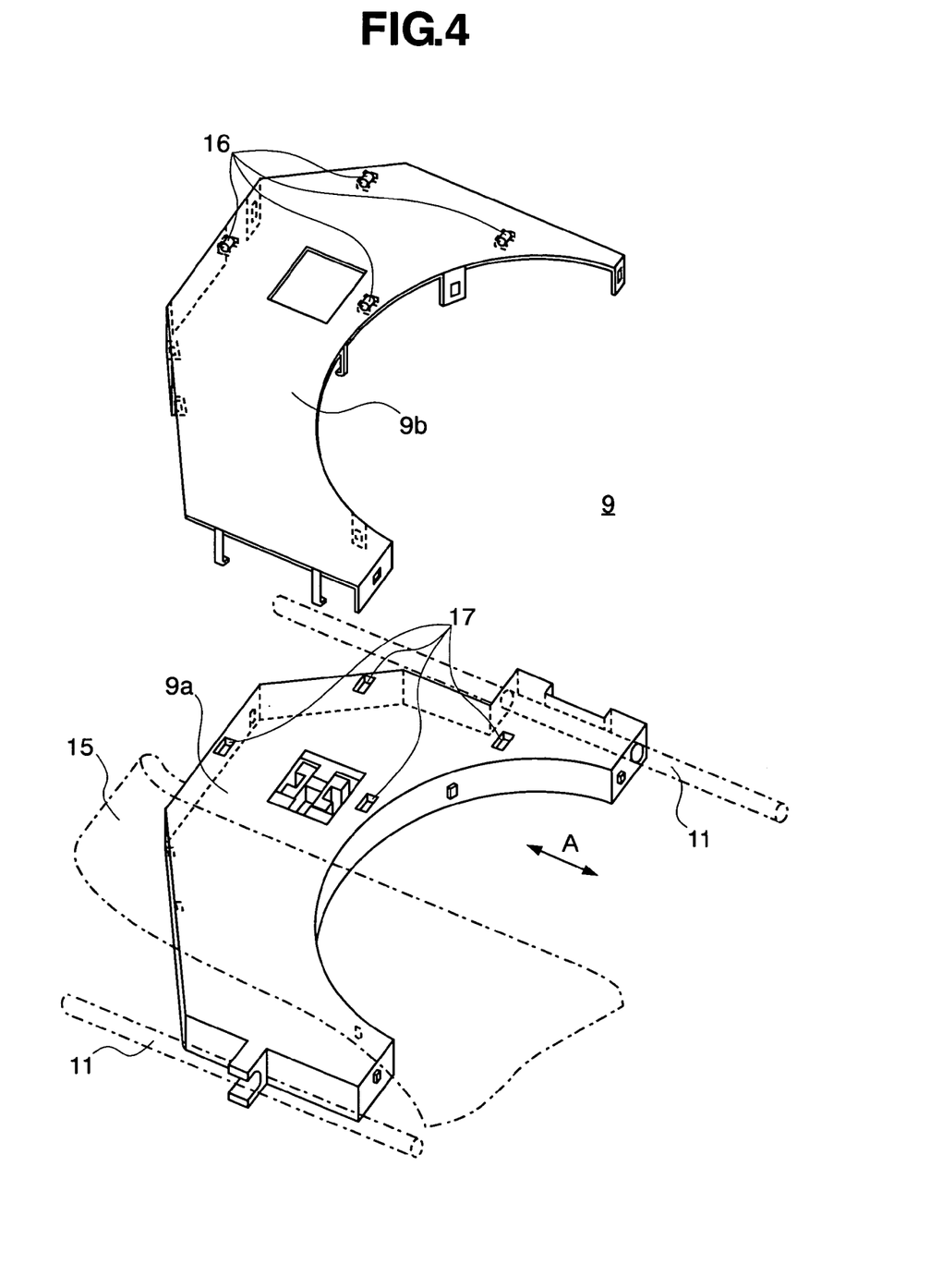
FIG. 4 is an exploded perspective bottom view of the pickup of the optical disc drive shown in FIG. 1.

An embodiment of an optical disc drive according to the present invention will be described below with reference to FIGS. 1-4. FIG. 1 is an exploded perspective view of the optical disc drive, schematically showing its structure. FIG. 2 is a partially omitted bottom view of a portion of the optical disc drive, showing the drive with its main parts drawn from its housing, and with its under cover removed. FIG. 3 is a sectional view of the whole drive that is taken along line C-C in FIG. 2. FIG. 4 is an exploded perspective bottom view of the pickup of the optical disc drive. The optical disc drive of this embodiment is slim size used mainly in notebook and desktop computers. The optical disc drive is a tray-type optical disc drive that protrudes the pickup and other main parts of the drive from the housing of the drive so as to mount or dismount a disc 5. The structures and effects proper to all the embodiments of the present invention are basically similar to the structures and effects of optical disc drives having other structures.

The optical disc drive 1 has a housing including a top cover 2, a bottom cover 3, and a front panel 4. The top cover 2 mainly covers the top of the housing. The bottom cover 3 covers the bottom, right side, left side, and rear of the housing. The front panel 4 covers the front of the housing. The housing houses a tray 6, a printed circuit board 7 for signal processing, power supply, etc., and a mechanism chassis 8. A disc 5 can be mounted on the tray 6, which is supported in a slightly high position in the housing. The printed circuit board 7 is fitted near the rear of the housing and in a low position in the housing. The mechanism chassis 8 is positioned in the center of the tray 6 and fitted with main parts of the optical disc drive 1. The mechanism chassis 8 is fitted with a pickup 9 and a spindle motor 10. The pickup 9 has a laser diode, a laser diode driver, etc. (not shown). The laser diode is used for recording information on and reproducing information from the disc 5 on the tray 6. The spindle motor 10 rotates the disc 5. The pickup 9 is supported by a guiding mechanism 11, which is positioned on its right and left sides. The pickup 9 can move in directions A radial of the disc 5 when information is recorded on and reproduced from the disc 5. A metallic unit cover 12 covers the upper side of the mechanism chassis 8, except for a central portion of the pickup 9 that extends between the right and left sides of the pickup 9. A metallic under cover 13 covers the under side and the part of the under side of the tray 6, The metallic covers 12 and 13 are provided for design and to protect a disc 6 when it is mounted or dismounted, The tray 6 is supported by a loading mechanism 14, which is positioned on its right and left sides. The tray 6 can move in the directions B forward and backward of the housing when the tray 6 is conveyed with the mechanism chassis 8 out of the housing so that a disc 5 can be mounted or dismounted. The pickup 9 and the printed circuit board 7, which is positioned near the rear of the housing and in a low position in the housing, move relative to the mechanism chassis 8. Therefore, the pickup 9 and the printed circuit board 7 are connected to the mechanism chassis 8 by a flexible printed circuit board 15 having a turned-back portion. The flexible printed circuit board 15 enables transmission of control, signal processing, etc. without interfering with the movement of the pickup 9 and the printed circuit board 7. When information is recorded on or reproduced from the disc 5, heat is generated from the optical system, which includes the laser diode, the laser diode driver, etc. of the pickup 9, the spindle motor 10, the printed circuit board 7, etc. in the optical disc drive 1. The heat generation is high in density under certain conditions, which may include recording/reproduction speed, operation time, and ambient temperature. The temperatures of the laser diode and other parts of the pickup 9, which is particularly liable to become hot, may become higher than the proof temperature. This may make the operation of the optical disc drive 1 abnormal and/or shorten the life of the drive 1. Accordingly, the structure of the optical disc drive 1 needs to be such that the pickup 9, which particularly becomes hot, can radiate heat sufficiently to be cooled effectively.

In this embodiment, the under cover 13 faces and is fixed near the under side of the pickup 9, and covers the range within which the pickup 9 moves and the under side of the tray 6, which surround the pickup 9. In order to keep the pickup 9 out of contact with the under cover 13, movable spacers 16 are fitted to the under side of the pickup 9. The movable spacers 16 are positioned near the periphery of the pickup 9 and within a range that does not interfere with the flexible printed circuit board 15, which is connected to the mechanism chassis 8. The under cover 13, which is metallic, is high in thermal conductance and, as stated above, much larger in area than the under side of the pickup 9. It is possible to narrow the clearance between the under cover 13 and the under side of the pickup 9 by adjusting the facing ends to the pickup 9 of the movable spacers 16, the parts to which this cover 13 is fixed, etc. The narrowed clearance reduces the thermal conduction through the air layer and the thermal resistance created by heat radiation. This enables the under cover 13 to function as a so-called fin by receiving heat from the under side of the pickup 9 and well releasing the heat to the ambient air by means of convection and radiation. As a result, it is possible to cool the whole pickup 9 sufficiently in addition to the originally good heat radiation from the upper, front, and back sides of the pickup 9.

Figure 13A:
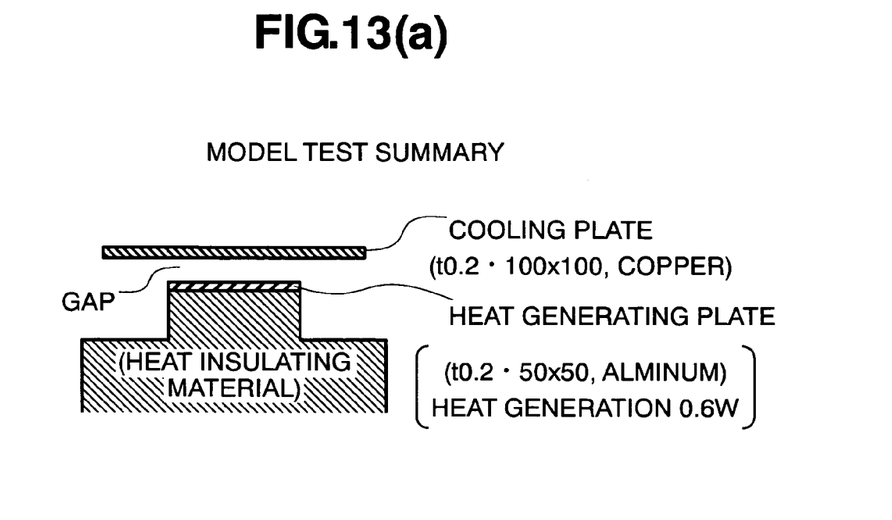
FIG. 13(a) is an explanatory drawing of a model test summary of the non-contacting cooling plate of the present invention and FIG. 13(b) is an explanatory drawing of model test results of the non-contacting cooling plate of the present invention.
Figure 13B:
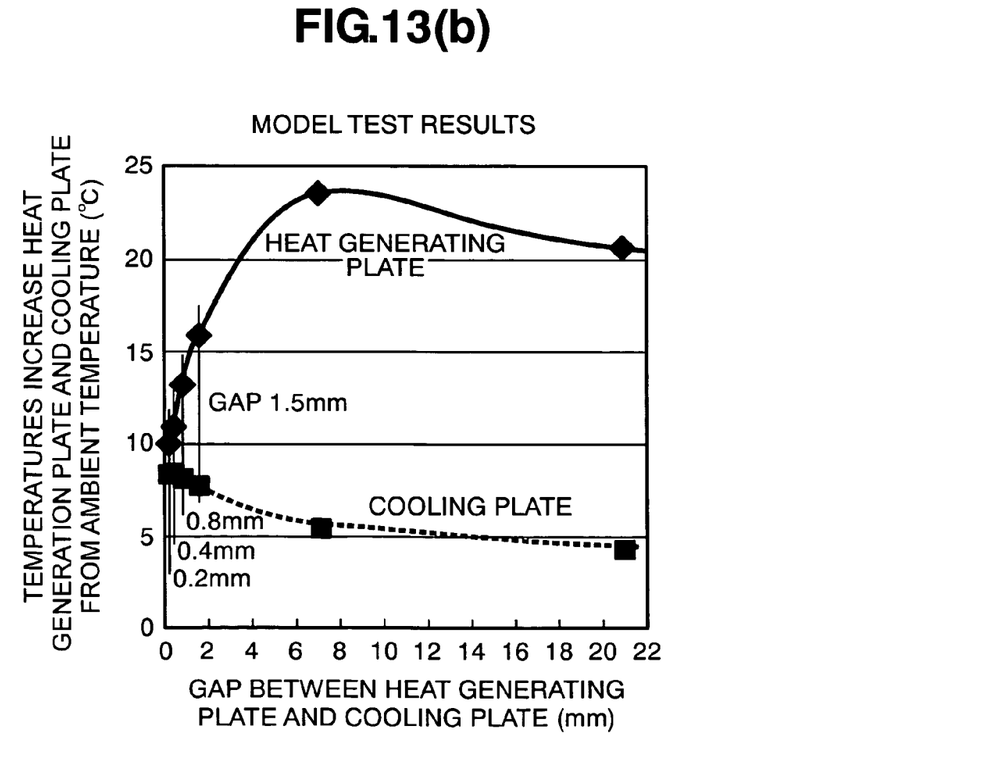

FIG. 13 shows a model test performed to actually confirm the effectiveness of a non-contacting cooling plate that cools such a pickup 9 without being in contact with it. In the model test, the heat generating plate and the cooling plate corresponded to the pickup and the non-contacting cooling plate (the under cover in this embodiment) respectively. The sizes of and the materials for these plates were selected within a range assumed for an actual optical disc drive. The results of the model test show a tendency that for the temperature of the heat generating plate to be high because this plate is cooled weakly by natural convection and the heat radiation into a wide space if the clearance between the two plates is 7 or more mm. The test results also show a tendency for the heat release from the heat generating plate to the cooling plate to increase by firstly heat radiation and then by the heat conduction through the air layer increase if the clearance becomes narrower than about 7 mm, the temperature of the heat generating plate is lowered quickly, and also the temperature of the cooling plate increases gradually at a rate according to the area ratio. In a general slim, tray-type optical disc drive 1, the clearance between the pickup and the under cover is about 1 mm or slightly narrower. If the clearance were as narrow as about 0.2-0.4 mm, the temperature of the pickup (the heat generating plate) would fall by 3-4 degrees C. Because these results are examples obtained according to the typical specification of optical disc drive, it is under test. If proper specifications are selected, it is basically proved that the pickup can be cooled well with the non-contacting cooling plate.

In this embodiment, the pickup 9 includes a pickup body 9a and a pickup cover 9b, which has supporting parts formed on it. The main part of each movable spacer 16, which is fitted on the under side of the pickup 9, is a resinous roller. It is particularly preferable that the roller be made of sliding material for resin bearings. The roller is supported rotatably by one of the supporting parts and a metallic shaft. The pickup body 9a have recesses 17 formed in it, which allow the rollers of the movable spacer 16 to rotate. The sliding material for resin bearings is low in friction and high in abrasion resistance, electric insulation, etc. Specifically, it is preferable to select this material from polyacetal, polytetrafluoroethylene, polyethylene, polypropylene, polyetheretherketone, polyphenylene sulfide, and the like. Even without lubrication, they have a very low coefficient of friction as compared with general metal, which has a coefficient of friction of 0.5 or more. Specifically, even without lubrication, they have a coefficient of friction of 0.3 or less, and most of them have a coefficient of friction of 0.2 or less. In this embodiment, because the movable spacers 16 rotate as rollers, their substantial coefficients of friction can be lower than if they would simply slide. This makes the clearance between the pickup 9 and the under cover 13 (the non-contacting cooling plate) very small. Consequently, even if the movable spacers 16 come into contact with the under cover 13, the moving resistance increase with respect to the original moving resistance of the guiding mechanism 11 by the contact of the spacers 16 is very limited. Such resistance increase does not interfere with the movement of the pickup 9 because this resistance increase is less than a half of that would be if the metallic pickup cover 9b came contact directly with the under cover 13, without the movable spacers 16 fitted. The high abrasion resistance of the material for the rollers of the movable spacers 16 prevents the production of contaminations such as frictional dust at a practical level. The electric insulation of the roller material keeps the pickup 9 and the under cover 13 from being needlessly conductive. Consequently as stated above, in this embodiment, the under cover 13 (the non-contacting cooling plate) and the movable spacers 16 function to cool the whole pickup 9 sufficiently, while preventing problems accompanied by the operation of the optical disc drive 1, such as recording on and reproduction from a disc.

Embodiment 2

Figure 5:
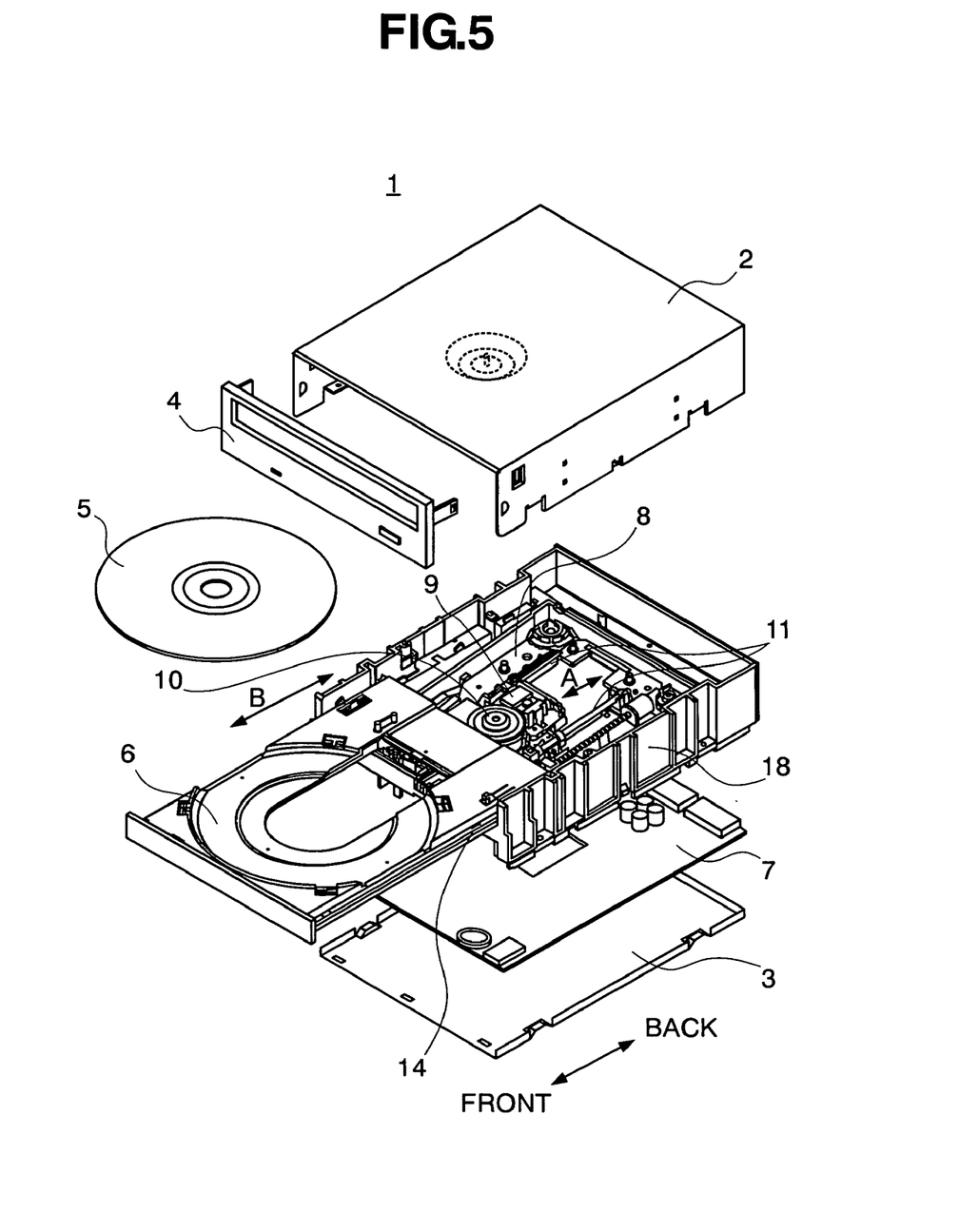
FIG. 5 is an exploded perspective view of another embodiment of the optical disc drive according to the present invention, schematically showing the structure of the drive.
Figure 6:
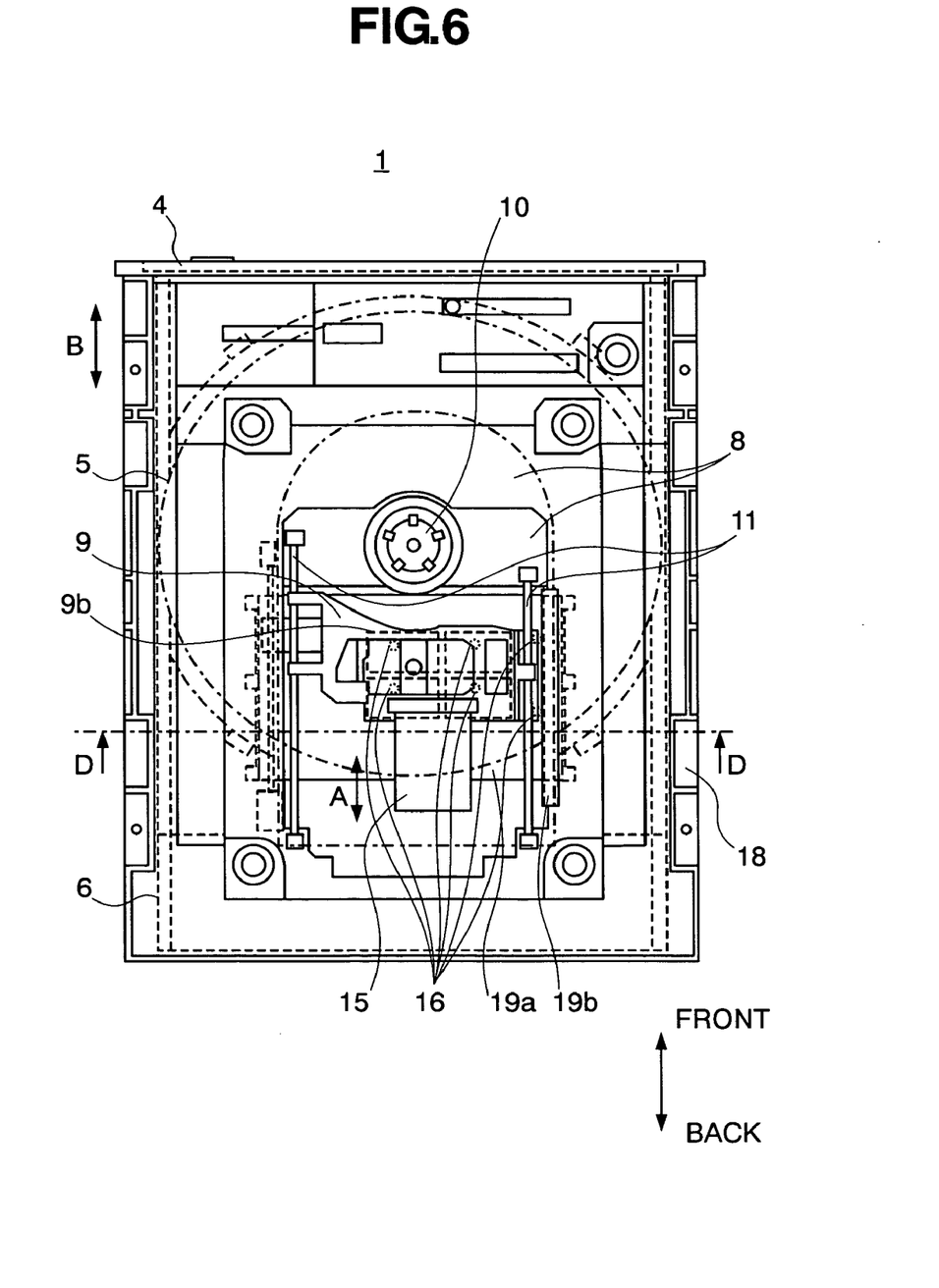
FIG. 6 is a partially omitted plane view of the optical disc drive shown in FIG. 5.
Figure 7:
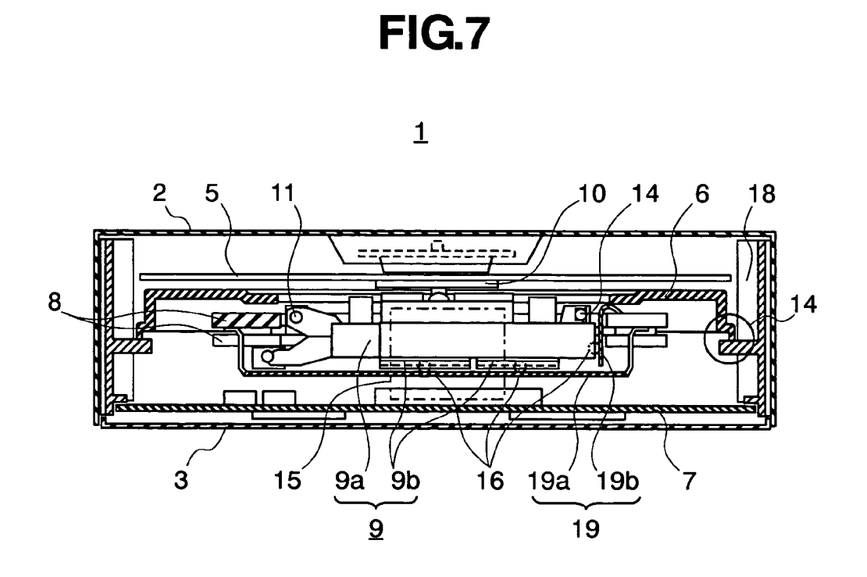
FIG. 7 is a sectional view of the whole drive that is taken along line D-D in FIG. 6.
Figure 8:
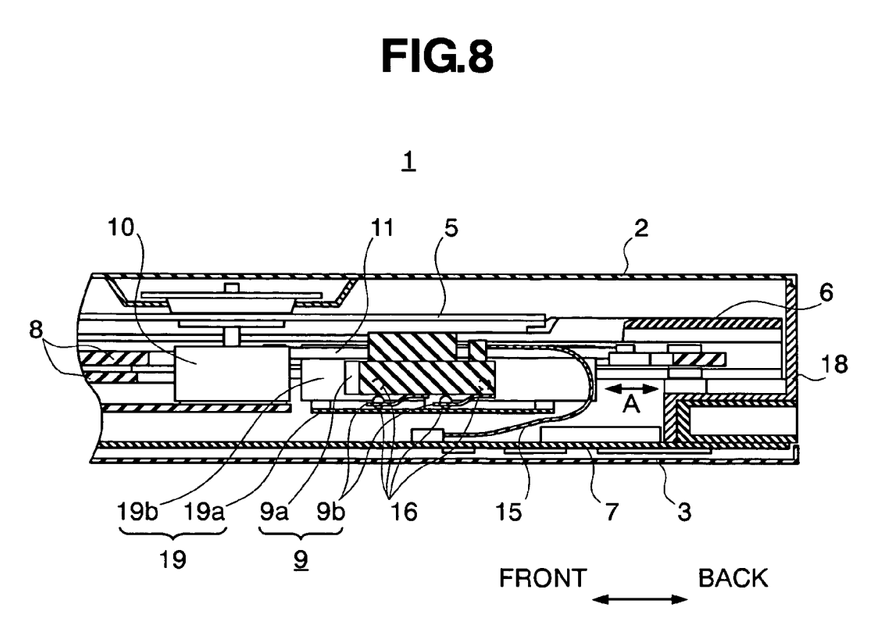
FIG. 8 is a sectional side view of a portion of the optical disc drive shown in FIG. 5.

Another embodiment of the optical disc drive according to the present invention will be described with reference to FIGS. 5-8. FIG. 5 is an exploded perspective view of the optical disc drive 1, schematically showing the structure of the drive. FIG. 6 is a partially omitted plane view of the optical disc drive 1, showing the drive from which its top cover 2 and tray 6 are removed. FIG. 7 is a sectional view of the whole drive 1 that is taken along line D-D in FIG. 6. FIG. 8 is a sectional side view of a rear portion of the optical disc drive 1. The optical disc drive 1 of this embodiment is half-height size used mainly in tower type and desktop computers and has a tray-type disc loading mechanism. The tray 6 and the mechanism chassis 8 are separate parts. When a disc 5 is mounted or dismounted, the tray 6 moves out of the housing, while the mechanism chassis 8 kept in the housing. In each of this embodiment and the succeeding embodiments, each part of the optical disc drive 1 is assigned the same reference numeral as the counterpart assigned in Embodiment 1, and descriptions will be provided mainly about the basic structure and effects of the drive 1 and about the structures and effects of the drive 1 that differ from those of Embodiment 1.

The housing of the optical disc drive 1 includes a top cover 2, a bottom cover 3, a front panel 4, and a mechanism block 18. The top cover 2 covers the top, right side, and left side of the housing. The bottom cover 3 covers the bottom of the housing. The front panel 4 covers the front of the housing. The mechanism block 18 covers the rear of the housing and extends forward inside the top cover 2, thereby forming part of the housing framework. The housing houses a tray 6, a printed circuit board 7, and a mechanism chassis 8. A disc 5 can be mounted on the tray 6, which is supported in a slightly high position in the housing. The printed circuit board 7 is fitted in a low position in the housing. The pickup 9 is supported in the mechanism chassis 8 and can move in forward and backward directions A at the back of a spindle motor 10. The tray 6 can move in forward and backward directions B and extrude from the housing so that a disc 5 can be mounted on and dismounted from the tray 6. The optical disc drive 1 differs from the slim size drive in that the top and bottom of the mechanism chassis 8 are not covered. The center opening of the tray 6 is nearly equal in width to the pickup 9 and in length to the range within which the pickup 9 moves. The pickup 9 records information on and reproduces information from the disc 5 through the center opening.

In this embodiment, two non-contacting cooling plates 19a and 19b adjacently face each other and are fixed to the mechanism chassis 8, covering the range within which the pickup 9 moves. The non-contacting cooling plate 19b is fixed in the form of a cantilever. The non-contacting cooling plate 19a covers the under side of the pickup 9. The non-contacting cooling plate 19b covers the side of the pickup 9 that is opposite to the drive unit for moving the pickup 9. The main part of each movable spacer 16 is a ball made of sliding material for resin bearings. The ball is supported rotatably in a semi-spherical supporting recess. Some of the movable spacers 16 are fixed to the pickup cover 9b in the form of cantilever extending from the pickup body 9a under the pickup 9. The other movable spacers 16 are fixed to the pickup body 9a on the side of the pickup 9. The pickup cover 9b and the non-contacting cooling plate 19b take the form of cantilever and bias the front ends of the movable spacers 16 elastically against the surfaces facing the spacers 16. This and the adjustment of the facing ends of the movable spacers 16, the parts to which the non-contacting cooling plates 19 are fixed, etc. make it possible to keep the clearance between the pickup 9 and each of the cooling plates 19 very small so that the spacer ends can be kept in contact with the cooling plates 19. The non-contacting cooling plates 19 may be made of a metal high in thermal conductance, and be much larger in area than the under, right, and left sides of the pickup 9 within the range of the foregoing structure. This makes it possible to radiate heat well from these sides of the pickup 9 as is the case with Embodiment 1. As a result, also in this embodiment, it is possible to cool the whole pickup 9 well in addition to the originally good heat radiation from the upper, front, and back sides of the pickup 9.

In this embodiment, the balls of the movable spacers 16 are made of sliding material for resin bearings, which is low in friction and high in abrasion resistance, electric insulation, etc. Because the balls roll, their substantial coefficients of friction can be lower than if they would simply slide. This, as stated in connection with Embodiment 1, makes the clearance between the pickup 9 and each non-contacting cooling plate 19 very small. Consequently, even if the movable spacers 16 come into contact with the non-contacting cooling plates 19, the moving resistance to the pickup 9 that is increased with respect to the original moving resistance of the guiding mechanism 11 by the contact of the spacers 16 is very low, so that the movement of the pickup 9 is not interfered with. The abrasion resistance of the material for the balls prevents the production of contaminations such as frictional dust at a practical level. The electric insulation of this material keeps the pickup 9 and the non-contacting cooling plates 19 from being needlessly conductive. For the foregoing reasons, in this embodiment, too, the non-contacting cooling plates 19 and the movable spacers 16 function to improve the overall cooling of the pickup 9, without causing any problem with the operation of the optical disc drive 1, such as recording on and reproduction from a disc.

Embodiment 3

Figure 9:
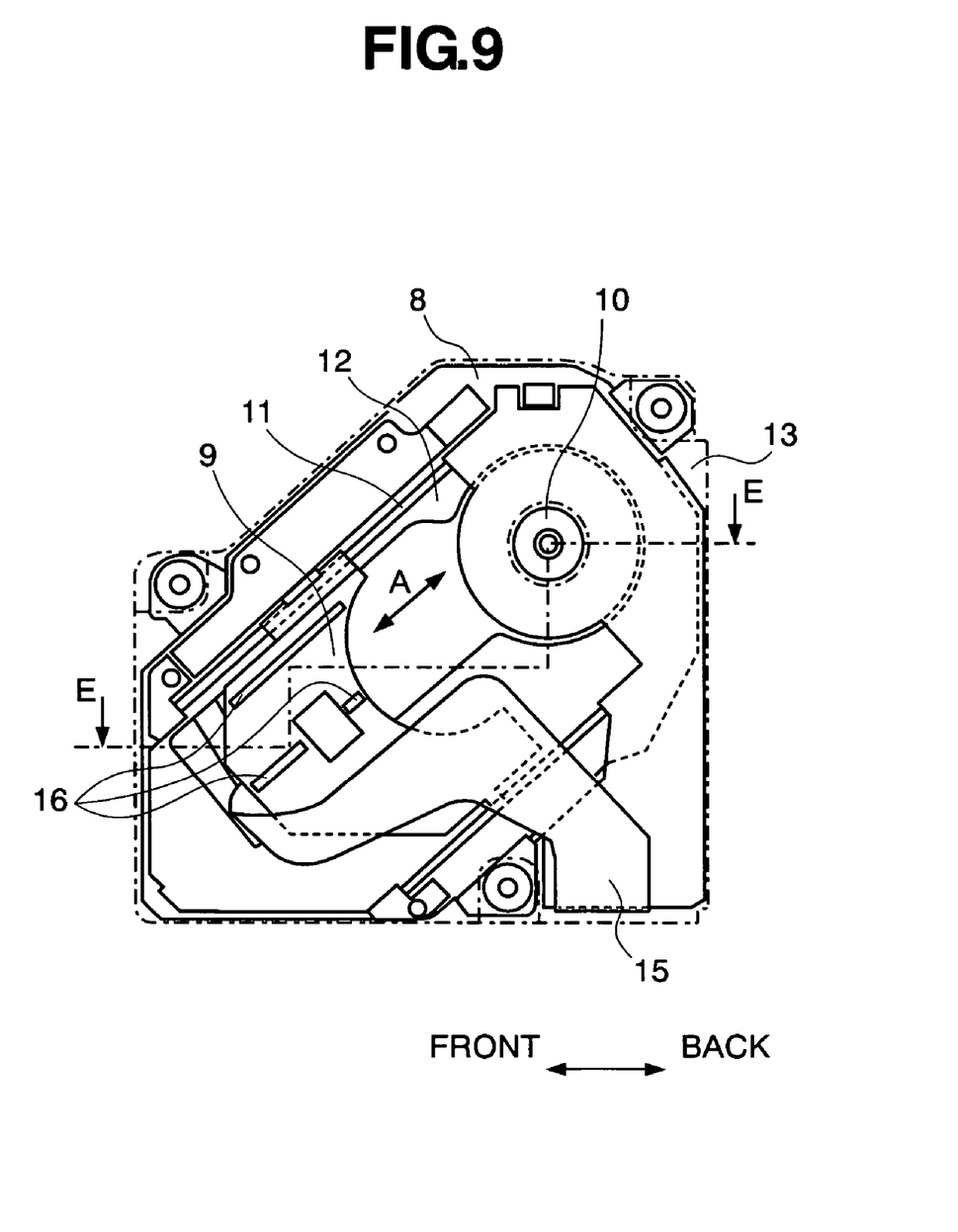
FIG. 9 is a partially omitted bottom view of the mechanism chassis and parts around it of another embodiment of the optical disc drive according to the present invention.
Figure 10:
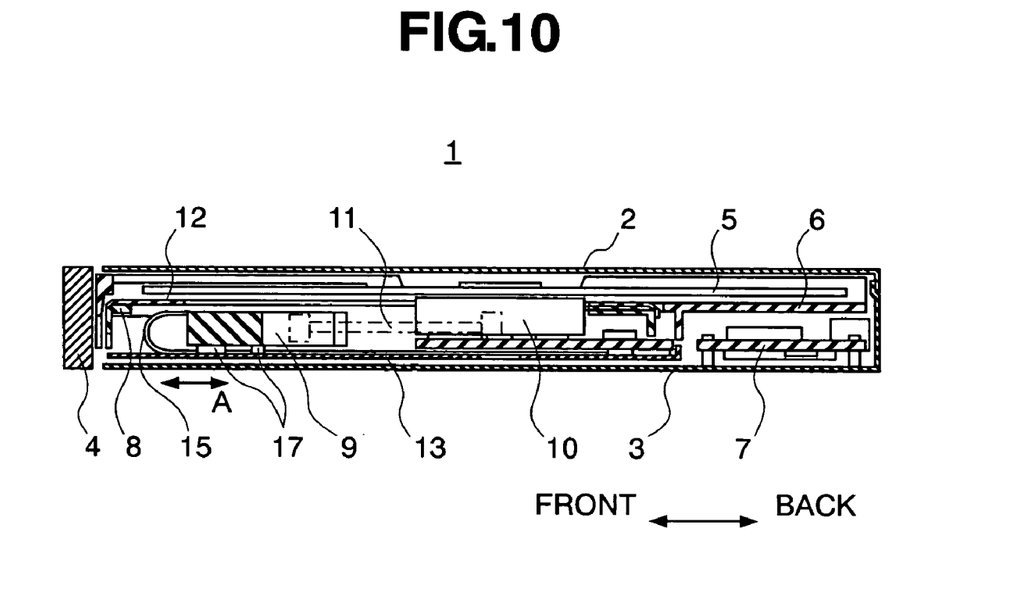
FIG. 10 is a sectional view of the whole drive that is taken along line E-E in FIG. 9.

Still another embodiment of the optical disc drive according to the present invention will be described with reference to FIGS. 9 and 10. FIG. 9 is a partially omitted plan view of the mechanism chassis 8 and parts around it of the optical disc drive 1, showing the drive 1 from which its under cover 13 is removed. FIG. 10 is a sectional view of the whole drive1 that is taken along line E-E in FIG. 9. The optical disc drive 1 of this embodiment is a thin, tray type optical disc drive similar to Embodiment 1.

In this embodiment, movable spacers 16 are fitted on the under side of a pickup 9 and positioned within a range where they do not interfere with the flexible printed circuit board 15 connected to the mechanism chassis 8. The movable spacers 16 are made of sliding material for resin bearings and take the form of band plates long in the directions in which the pickup 9 moves. The movable spacers 16 in the form of band plates make the clearance between the pickup 9 and an under cover 13 very small. The under cover 13 adjacently faces the under side of the pickup 9. Depending on the shapes of the pickup 9 and parts around it, the sliding movable spacers 16 in the form of band plates may be simple and easy to fit. Because the movable spacers 16 take the form of band plates, it is possible to effectively prevent contact directly between the pickup 9 and the under cover 13 by positioning the spacers 16 near the periphery, front, rear, etc. of the pickup 9. In some cases, the sliding movable spacers 16 in the form of band plates are simple and easy to fit. In order to fix the sliding movable spacers 16 in the form of band plates securely to the under side of the pickup 9 and make their height adjustable to be low, it is preferable to form recesses (not shown) or fit screws (not shown) on the under side of the pickup 9 so that the spacers 16 can engage with them or adhere to them.

As is the case with Embodiments 1 and 2, it is possible to radiate heat well from the under side of the pickup 9 well through the metallic under cover 13 by keeping the clearance between this cover 13 and the under side of the pickup 9 very small by adjusting the facing ends of the movable spacers 16, the parts to which the spacers or the non-contacting cooling plates are fixed, etc. This, in addition to the originally good heat radiation from the upper, front, and back sides of the pickup 9, makes it possible to improve the cooling of the whole pickup 9.

In this embodiment, the movable spacers 16 are made of sliding material for resin bearings and take the form of band plates. The movable spacers 16 are used with their facing ends sliding on the under cover 13 while they are in contact with this cover 13. As stated in connection with the first embodiment, the sliding material for resin bearings that is used for the movable spacers 16 has a coefficient of friction as low as about ⅓ of the coefficient of friction of general metal, which is 0.5 or more. Most of such sliding materials have a coefficient of friction of 0.2 or less. Because the sliding material is resin, which is softer than metal, the movable spacers 16 fit very small irregularities on the metallic part in contact with which the spacers 16 slide. This prevents problems such as an increase in the coefficient of friction of the movable spacers 16, which would be increased if the spacers 16 were metallic and came into local contact with the metallic part. As a result, the coefficient of friction is kept stably low. By adjusting the contact pressure and area of the contact parts adequately, which influence moving resistance, the clearance between the pickup 9 and the under cover 13 can be set very small. Consequently, even if the movable spacers 16 come into contact with the under cover 13, the moving resistance increase to the pickup 9 in addition to the original moving resistance of the guiding mechanism 11 by the contact of the spacers 16 is very low, so that the movement of the pickup 9 is not interfered with. The high abrasion resistance of the material for the band plates prevents the production of contaminations such as frictional dust at a practical level. The electric insulation of this material keeps the pickup 9 and the under cover 13 from being needlessly conductive. For the foregoing reasons, also in this embodiment, the under cover 13 (the non-contacting cooling plate) and the movable spacers 16 function to improve the overall cooling of the pickup 9, without causing any problem with the operation of the optical disc drive 1, such as recording on and reproduction from a disc.

Embodiment 4

Figure 11:
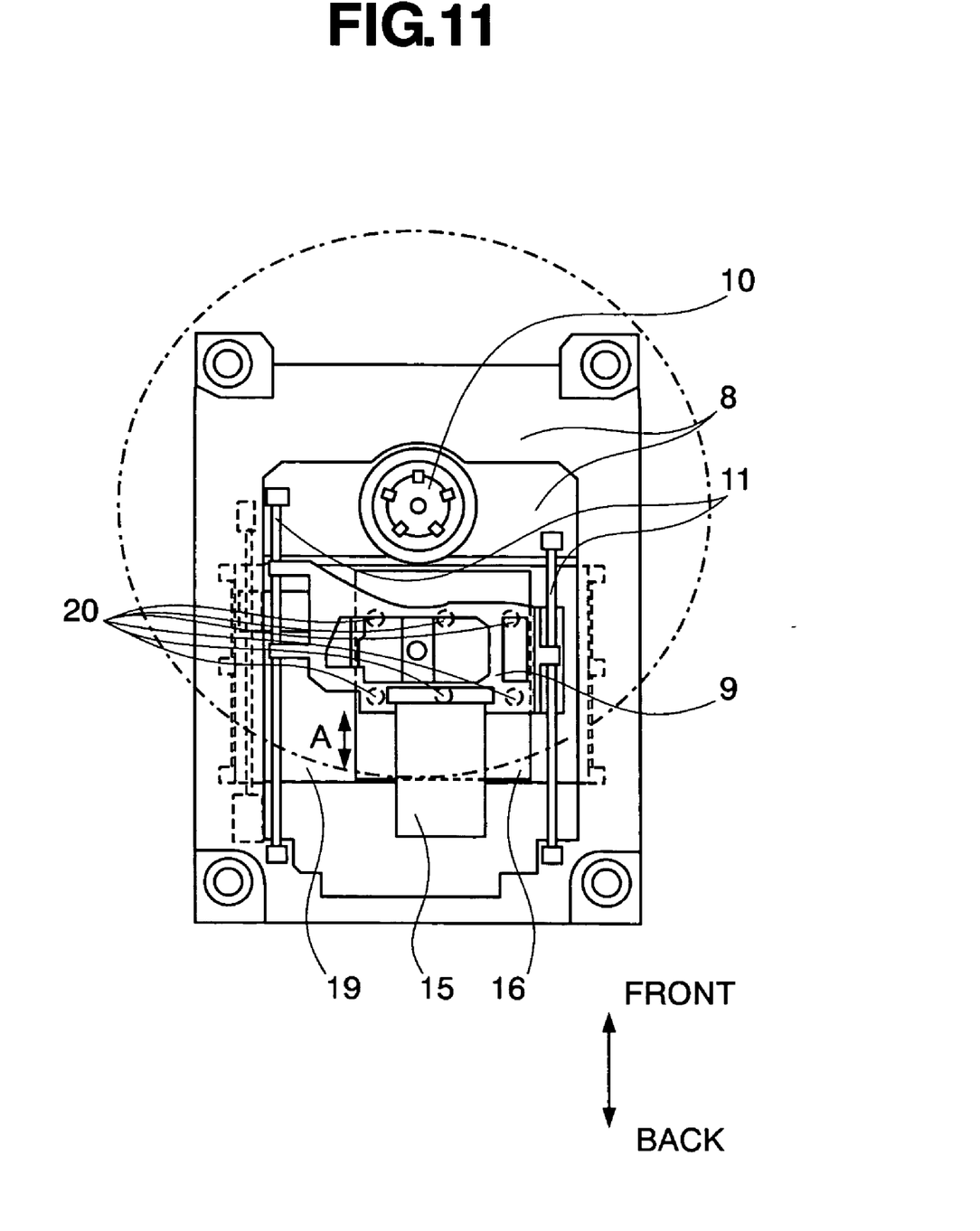
FIG. 11 is a partially omitted plan view of the mechanism chassis and parts around it of another embodiment of the optical disc drive according to the present invention.
Figure 12:
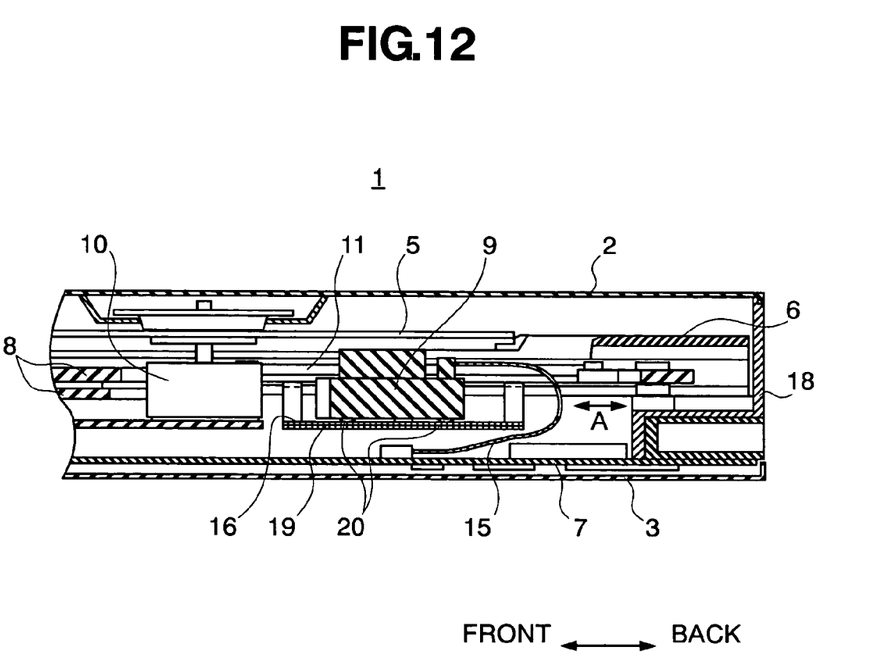
FIG. 12 is a sectional side view of a portion of the optical disc drive shown in FIG. 11.

A further embodiment of the optical disc drive according to the present invention will be described with reference to FIGS. 11 and 12. FIG. 11 is a partial plane view of the mechanism chassis 8 and parts around it of the optical disc drivel. FIG. 12 is a sectional side view of a rear portion of the optical disc drive 1. The optical disc drive 1 of this embodiment is a half height, tray-type optical disc drive similar to the second embodiment.

In this embodiment, a non-contacting cooling plate 19 adjacently faces the under side of a pickup 9 and the range within which the pickup 9 moves. The non-contacting cooling plate 19 is fixed to the mechanism chassis 8. A movable spacer 16 in the form of a sheet made of sliding material for resin bearings is adhered to the upper side of the non-contacting cooling plate 19 and covers at least the range within which a main portion of the pickup 9 moves. The pickup 9 has protrusions 20 in the form of hills formed on its under side. When the clearance between the pickup 9 and the non-contacting cooling plate 19 becomes very small, the protrusions 20 come into contact with the movable spacer 16 in the form of a sheet, which covers the upper side of the cooling plate 19. The movable spacer 16 takes the form of a sheet covering the whole upper side of the non-contacting cooling plate 19. The protrusions 20 are positioned near the periphery, front end, and rear end of the pickup 9 so as to effectively prevent direct contact between the pickup 9 and the under cover 13. In this embodiment, the minimum clearance between the non-contacting cooling plate 19 and the under side (most of the under side, exclusive of the protrusions 20) of the pickup 9 can be adjusted in consideration of the height of the protrusions 20, the flatness of the cooling plate 19, etc. The non-contacting cooling plate 19 is made of metal, which is generally high in thermal conductance. The non-contacting cooling plate 19 is considerably large in area because, as stated above, it covers the range within which the main portion of the under side of the pickup 9 moves. Adjustment of the height of the protrusions 20 etc. keeps clearance between the non-contacting cooling plate 19 and the under side of the pickup 9 very small. These make it possible to radiate heat well from the under side of the pickup 9 as is the case with Embodiments 1-3. As a result, also in this embodiment, it is possible to cool the whole pickup 9 sufficiently in addition to the originally good heat radiation from the upper, front, and back sides of the pickup 9.

In this embodiment, the movable spacer 16 takes the form of a sheet and is used with the protrusions 20, which are formed on the under side of the pickup 9, sliding on the upper side of the spacer 16 while the spacer is in contact with the under side of the pickup 9. As is the case with the third embodiment, the movable spacer 16, which is made of sliding material for resin bearings, is used as a slider. The movable spacer 16 is made of a sliding material for resin bearings that is suitable for a sheet. The shape, number, arrangement, etc. of the protrusions 20 are so adjusted that the contact pressure and area of the contact parts, which influence moving resistance, can be adequate. These, as is the case with Embodiment 3, make the clearance between the pickup 9 and the non-contacting cooling plate 19 very small. Consequently, even if the movable spacer 16 comes into contact with the protrusions 20, the moving resistance increase to the pickup 9 in addition added to the original moving resistance of the guiding mechanism 11 by the contact of the spacer 16 is very low, so that the movement of the pickup 9 is not interfered with. The high abrasion resistance of the material for the movable spacer 16 prevents the production of contaminations such as frictional dust. The electric insulation of this material keeps the pickup 9 and the non-contacting cooling plate 19 from being needlessly conductive. For the foregoing reasons, also in this embodiment, the pickup 9 can be cooled sufficiently through the non-contacting cooling plate 19, but the movable spacer 16 causes no problem with the operation of the optical disc drive 1, such as recording on and reproduction from a disc.

In each of the embodiments of the present invention, the optical disc drive 1 is a tray-type optical disc drive, in which its main parts are protruded from its housing when a disc is mounted or dismounted. However, the optical disc drive according to the present invention may be a slot-in type optical disc drive, which draws in and discharges a disc through the slot on the front side of the housing, instead of protruding the main parts of the drive. If the non-contacting cooling plate and movable spacer of the slot-in type optical disc drive have a structure similar to those of the embodiments, are made of materials similar to those of the embodiments, and/or are formed similarly to the embodiments, the drive achieves apparently similar effects of the present invention.

If the movable spacer is a coating thinner than the foregoing sheet, it is preferable that the spacer be a fluororesin coating or the like similar to polytetrafluoroethylene, which is one of the sliding materials for resin bearings mentioned in connection with the first embodiment, and which is suitable for a coating as well.

As explained in connection with the model test of the non-contacting cooling plate, more cooling effect is achieved as the clearance between the pickup 9 and the non-contacting cooling plate 19 decreases. The clearance range within which suitable effects are achieved by the movable spacer 16 of the present invention is considered as follows. The upper limit of the clearance is equal to or smaller than the flatness of the non-contacting cooling plate 19 because the clearance that could be maintained without the spacer is considered to be on the order of the flatness. Specifically, because the flatness of the non-contacting cooling plate 19 is nearly equal to or nearly twice the thickness of this plate, the upper limit of the clearance is about 0.5 mm, determined from the size of this plate 19 (which is about 50 or more mm square because the width of the pickup and the range within which it moves are about 40 mm) and the thickness (about 0.2-0.4 mm) of the plate 19. The lower limit of the clearance can conceivably be set nearly at the dimensional tolerance of the whole movable spacer 16 if the spacer is rollers or balls, for example. Specifically, the lower limit is about 0.05 mm because of the dimensional tolerances of the diameter of the rollers or the like, the shafts on which they rotate, their parts engaging with the parts supporting them, and because the dimensional tolerance of the whole movable spacer 16 is about 0.05 mm, which is several times the basic tolerance of 0.006-0.01 mm. (class 6 or 7) for the size of 3 or less mm (assumed as the representative size of the spacer parts) as specified by JIS B0401-1965. The lower limit of the clearance that can be set with the movable spacer 16 in the form of band plates, a sheet, or a coating is about 0.05 mm because the spacer 16 needs to have a thickness of about 0.05 mm in consideration of its durability under tough conditions where it slides constantly, although some of the resinous materials that can be used for the spacer 16 have a thickness of 0.05 or less mm. Accordingly, in the present invention, the practically effective clearance between the pickup 9 and the non-contacting cooling plate 19 ranges between 0.05 mm and 0.5 mm.

The movable spacer 16 is made of sliding material for resin bearings, which are characterized by low friction etc. It is preferable that this material should have a low coefficient of friction so as to keep the movable spacer 16 from interfering with the movement of the pickup 9 even if the spacer 16 comes into contact with the pickup 9. The frictional force created by contact with a surface is also proportional to the force perpendicular to the surface and can be weakened to a certain extent by the means of adjusting the clearance and of biasing the movable spacer 16 elastically. Accordingly, the present invention can be used effectively if the movable spacer 16 has a coefficient of friction of 0.3 or less, which can be attained with sliding material for resin bearings.

Although the embodiments of the present invention have been described hereinbefore, the invention is not limited to the embodiments but may be embodied in other forms. The movable spacer 16 in the form of rollers, balls, band plates, a sheet, or the like may be fitted to either the pickup 9 or the non-contacting cooling plate 19. Different types of movable spacers may be fitted to the pickup 9 and the non-contacting cooling plate 19. The present invention can be applied to either thin or thick optical disc drives.

What is claimed is:

1. An optical disc drive comprising:
a spindle motor for rotating an optical disc;
a pickup for irradiating the optical disc with a laser beam;
a guiding mechanism on which the pickup is supported movably in a radial direction of the optical disc;
a mechanism chassis to which the spindle motor, the pickup, and the guiding mechanism are fitted;
a housing capable of housing the mechanism chassis;
a metallic non-contacting cooling plate fitted on either the side of the mechanism chassis that is opposite to the side thereof on which the optical disc can be mounted or one side thereof along which the pickup moves, wherein the cooling plate is formed separately from the pickup and faces the pickup adjacently, and wherein the side of the pickup that is adjacent to the cooling plate is metallic; and
a sliding spacer provided on either the side of the pickup that is adjacent to the cooling plate or the side of the cooling plate that is adjacent to the pickup;
wherein the spacer takes the form of a band plate long in the direction in which the pickup moves.

2. An optical disc drive comprising:
a spindle motor for rotating an optical disc;
a pickup for irradiating the optical disc with a laser beam;
a guiding mechanism on which the pickup is supported movably in a radial direction of the optical disc;
a mechanism chassis to which the spindle motor, the pickup, and the guiding mechanism are fitted;
a housing capable of housing the mechanism chassis;
a metallic non-contacting cooling plate fitted on either the side of the mechanism chassis that is opposite to the side thereof on which the optical disc can be mounted or one side thereof along which the pickup moves, wherein the cooling plate is formed separately from the pickup and faces the pickup adjacently, and wherein the side of the pickup that is adjacent to the cooling plate is metallic; and
a sliding spacer provided on either the side of the pickup that is adjacent to the cooling plate or the side of the cooling plate that is adjacent to the pickup;
wherein the spacer takes the form of a sheet provided on the non-contacting cooling plate.

3. The optical disc drive as claimed in claim 2, wherein the spacer takes the form of a plurality of hills.

4. The optical disc drive as claimed in claim 2, wherein the cooling plate facing the pickup is not mounted to the pickup.

5. The optical disc drive as claimed in claim 2, wherein the sliding spacer is comprised of a resinous material.

6. An optical disc drive comprising:
a spindle motor for rotating an optical disc;
a pickup for irradiating the optical disc with a laser beam;
a guiding mechanism on which the pickup is supported movably in a radial direction of the optical disc;
a mechanism chassis to which the spindle motor, the pickup, and the guiding mechanism are fitted;
a housing capable of housing the mechanism chassis;
a non-contacting cooling plate fitted on either the side of the mechanism chassis that is opposite to the side thereof on which the optical disc can be mounted or one side thereof along which the pickup moves, wherein the cooling plate is formed separately from the pickup and faces the pickup adjacently;
a rolling spacer provided on either the side of the pickup that is adjacent to the cooling plate or the side of the cooling plate that is adjacent to the pickup, wherein the spacer includes a main part in the form of either a roller or a ball; and
a means for biasing the spacer elastically in the direction in which the clearance between the spacer and the non-contacting cooling plate narrows.

7. An optical disc drive comprising:
a spindle motor for rotating an optical disc;
a pickup for irradiating the optical disc with a laser beam;
a guiding mechanism on which the pickup is supported movably in a radial direction of the optical disc;
a mechanism chassis to which the spindle motor, the pickup, and the guiding mechanism are fitted;
a housing capable of housing the mechanism chassis;
a non-contacting cooling plate fitted on either the side of the mechanism chassis that is opposite to the side thereof on which the optical disc can be mounted or one side thereof along which the pickup moves, wherein the cooling plate is formed separately from the pickup and faces the pickup adjacently;
a rolling spacer provided on either the side of the pickup that is adjacent to the cooling plate or the side of the cooling plate that is adjacent to the pickup, wherein the spacer includes a main part in the form of either a roller or a ball; and a tray;

the non-contacting cooling plate being a cover covering the under side of the mechanism chassis; and the tray and the mechanism chassis being able to protrude forward from the housing.

8. The optical disc drive as claimed in claim 7, wherein the spacer is provided near the front and rear ends of the mechanism chassis.

9. The optical disc drive as claimed in claim 7, wherein the clearance between the pickup and the non-contacting cooling plate is 0.05-0.5 mm.

10. The optical disc drive as claimed in claim 7, wherein the spacer is made of a material having a coefficient of friction of 0.3 or less.

11. The optical disc drive as claimed in claim 7, wherein the spacer is made of any one of polyacetal, polytetrafluoroethylene, polyethylene, polypropylene, polyetheretherketone, polyphenylene sulfide.

12. The optical disc drive as claimed in claim 7, further comprising a means for adjusting the clearance between the spacer and the non-contacting cooling plate.

13. The optical disc drive as claimed in claim 7, further comprising:

a rolling or sliding spacer for preventing the pickup and the non-contacting cooling plate from coming into contact with each other;

the spacer having a resinous main part.

14. The optical disc drive as claimed in claim 7, wherein the cooling plate facing the pickup is not mounted to the pickup.

15. The optical disc drive as claimed in claim 7, wherein the main part of the spacer is comprised of a resinous material.

* * * * *